United States Patent Office 3,492,259
Patented Jan. 27, 1970

3,492,259
PROCESS FOR POLYMERIZING VINYL FLUORIDE
Leon Edward Wolinski, Buffalo, N.Y., assignor to E. I. du Pont de Nemours and Company, Wilmington, Del., a corporation of Delaware
No Drawing. Continuation-in-part of application Ser. No. 578,167, Sept. 9, 1966. This application May 17, 1967, Ser. No. 639,018
Int. Cl. C08f 1/08, 3/22
U.S. Cl. 260—29.6                                4 Claims

ABSTRACT OF THE DISCLOSURE

Polymerization of vinyl fluoride in mixtures of dimethyl sulfoxide/water to form directly coalescible organosol.

The invention

The present application is a continuation-in-part of my copending application Ser. No. 578,167, filed Sept. 9, 1966, now abandoned.

The present invention relates to a polymerization process and, more particularly, is directed to a new and improved process for polymerizing vinyl fluoride.

Polyvinyl fluoride is a well known thermoplastic polymeric material described in, for example, U.S. Patent 2,419,010 to Coffman and Ford. It also is known to prepare shaped structures of polyvinyl fluoride such as, for example, self-supporting films and coatings by solution casting techniques wherein the polyvinyl fluoride is first dissolved in a heated solvent therefor such as, for example, cyclohexanone, dimethylformamide and tetramethylene sulfone, in a manner also described in U.S. Patent 2,419,010 or by the use of dispersions of polyvinyl fluoride as described in U.S. Patent 3,096,299. The above-described procedures for obtaining shaped structures of polyvinyl fluoride are undesirable since requiring several wholly separate and distinct processes of first polymerizing vinyl fluoride and recovering the polymer product. In the next process, the polymerized vinyl fluoride is dispersed or dissolved in an appropriate solvent therefor and shaped structures thereof such as sheets and films are prepared by extruding or casting the polymer and removing the solvent therefrom as by heating in order to obtain a shaped structure thereof. Accordingly, it is the principal object of the present invention to overcome the drawbacks and limitations of the above-described procedures and to provide a new and improved process for the manufacture of polyvinyl fluoride and the preparation of shaped structures thereof.

According to the present invention there is provided a process for preparing directly coalescible organosols of polyvinyl fluoride which comprises polymerizing vinyl fluoride in an aqueous medium comprising dimethyl sulfoxide and up to about 85% by weight, based upon the total weight of said aqueous medium, of water, at a temperature of between about 55° C. and about 140° C. and a pressure of between about 1,000 p.s.i. and about 15,000 p.s.i. thereby to obtain a directly coalescible organosol of polyvinyl fluoride. The polymerized vinyl fluoride is preferably coalesced and extruded in an aqueous medium having a weight ratio of dimethyl sulfoxide-to-water of between about 88/12 and about 97/3. In a preferred embodiment, the directly coalescible organosol of polyvinyl fluoride is heated to coalesce the polyvinyl fluoride, followed by extruding the coalesced polyvinyl fluoride into a shaped structure, preferably a self-supporting film structure.

The nature and advantages of the present invention will be more clearly understood from the following more detailed description thereof.

The process of the present invention comprises essentially the polymerization of vinyl fluoride and, more specifically, embraces the homopolymerization of vinyl fluoride or the copolymerization of vinyl fluoride with one or more other mono-ethylenically unsaturated monomers copolymerizable therewith wherein the polyvinyl fluoride represents at least 30% by weight of the total copolymer weight. Suitable monoethylenically unsaturated monomers copolymerizable with vinyl fluoride include, for example: mono-ethylenic hydrocarbons, e.g., ethylene, propylene, isobutylene and styrene; halogen-substituted mono-ethylenic hydrocarbons, e.g., vinyl chloride, vinyl bromide, 1,1-dichloroethylene, 1,1-difluoroethylene, difluorochloroethylene, trifluorochloroethylene, tetrafluoroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, vinyl esters of inorganic acids; vinyl ethers, e.g., vinyl ethyl ether, tetrafluoroethylallyl ether and vinyl dioxalane; vinyl ketones, e.g., methyl vinyl ketone; N-vinyl imides, e.g., N-vinyl succinimide, and N-vinyl phthalimide; acrylic and methacrylic acids and their derivatives, e.g., esters, amides, anhydrides and acid halides, including methyl methacrylate, betahydroxyethyl methacrylate, allyl methacrylate, N-butyl methacrylamide, etc.; derivatives of maleic and fumaric acids, e.g., diethylmaleate and dimethylfumarate; propenyl esters, e.g., allyl acetate, isopropenyl acetate, etc.

The polymerization process of the present invention may be conducted at temperatures of between about 55° C. and about 140° C. The lower of the temperatures above mentioned is near the critical temperature of vinyl fluoride and polymerizations conducted in a one phase system with the free radical initiators have been difficult to control. Above 140° C. the decomposition rate of the initiator is so great that it becomes difficult to maintain a uniform concentration of materials in the reaction vessel at the low level required to produce the desired high molecular weight polymer. Thus the upper limit of temperature that is mentioned above is necessary in order to obtain a practicable process for obtaining high molecular weight polymers.

The polymerization process may be conducted at pressures of between about 1,000 p.s.i. and about 15,000 p.s.i. The lower pressure of 1,000 p.s.i. is chosen because the rate of reaction of the monomer decreases too greatly at pressures below this level. The upper pressure of 15,000 p.s.i. is dictated largely by economic considerations since at higher pressure levels the cost of suitable pressure equipment increases greatly. Thus, the higher pressure mentioned above is determined largely by equipment costs and availability.

The polymerization process of the present invention is conducted in an aqueous medium comprising dimethyl sulfoxide and up to 85% by weight, based upon the total weight thereof, of water. It has quite surprisingly and totally unexpectedly been found that only the combination of dimethyl sulfoxide and water provides both a satisfactory polymerization medium for obtaining high molecular weight polymers of vinyl fluoride and which, in further combination with the polymerized vinyl fluoride, provides an organosol of polymerized vinyl fluoride which may be directly coalesced and extruded into shaped structures such as self-supporting films or coatings thereof. The upper limit of 85% water is prescribed since above this point the molecular weight starts to decrease and insoluble polymer starts to form which impairs its extrudability. Furthermore, more water requires greater process time for its removal to obtain an extrudable composition. At high dimethyl sulfoxide contents, the polymer constituent of the organosols tends to become solvated at high polymerization temperatures and the organosols lose their fluidity due to coalescence. Thus, it is possible to polymerize in 100% dimethyl sulfoxide, but it is difficult to maintain a fluid organosol. In a continuous process, this same limitation does not exist. However, at 100% dimethyl sulfoxide to 70% dimethyl sulfoxide/30% $H_2O$ the highest molecular weight polymers were not obtained. (This is not necessarily bad, but shows the necessity for controlling the composition.) The polymerization in the aqueous dimethyl sulfoxide medium is preferably carried out with an amount of monomeric material therein ranging between about 5% and about 60% by weight, based upon the total weight of the aqueous medium and the monomeric materials. The optimum concentration of dissolved monomer in specific instances depends upon such factors as the molecular weight which is desired to be obtained in the polymerized product, the resultant viscosity which is desired to be achieved in the directly formed extrusion-casting system and the extrusion-casting conditions, including the coalescence and drying requirements and may be conveniently varied to obtain the desired end product. Additionally, the polymerization reaction may be conducted in the presence of any suitable catalysts such as, for example, benzoyl peroxide, $\alpha,\alpha$-azobis-isobutyronitrile, $N_2F_2 \cdot NF_3$, which may be employed in the conventional manner and in a quantitative amount as is well known to those skilled in the art.

In a preferred embodiment of the process of the present invention, the organosol which is obtained and which contains the dimethyl sulfoxide, water and polymerized vinyl fluoride, is directly extruded into any suitable shaped structure such as a self-supporting film or a coating. One convenient method of forming a shaped structure such as a film or sheet comprises feeding the organosol with or without opacifying coloration pigment, ultraviolet light absorber compound, thermal stabilizer, antioxidant, deglossing agents, wetting agents, plasticizers, fillers and other desired modifiers incorporated thereinto, to a heated extruder of conventional design and provided with a heated casting hopper having a slot or orifice for forming the extrudate passing therethrough into a film or sheet of predetermined thickness. The organosol in the extruder is heated to a temperature effective to coalesce completely the polymer particles and form a single phase fluid composition. A suitable temperature for coalescence is, for example, 150° C. A tough coalesced extrudate of polyvinyl fluoride film is continuously extruded in self-supporting film form containing some of the aqueous dimethyl sulfoxide medium and then quenched. The polyvinyl fluoride film is then preferably heated and stretched in one or more directions while the aqueous dimethyl sulfoxide medium is volatilized therefrom.

It is preferred to maintain the directly coalescible organosol within a weight ratio of dimethyl sulfoxide-to-water between about 88/12 and 97/3, since it is somewhat difficult to coalesce an organnosol of dimethyl sulfoxide-to-water of less than about 88/12 in a heated screw extruder. At weight ratios of dimethyl sulfoxide-to-water greater than about 97/3, it is difficult to maintain a fluid system without cooling below 20° C. at which temperature condensation of water vapor from the air occurs and dilutes the solvent unless the organosol is maintained under dry nitrogen or other dry inert gas, e.g., $CO_2$. Freezing of an organosol having a weight ratio of dimethyl sulfoxide-to-water of 98/2 occurs at 10° C. or less; 100% dimethyl sulfoxide freezes at 18.5° C. Organosols must be kept below 20° C., because the solvent activity of dimethyl sulfoxide increases above this temperature to the extent that the polymeric chains are solvated by the strong polar aprotic solvent dimethyl sulfoxide. It is believed that the solvent action causes an increase in the size of the individual polymer particles which increases their tendency to collide and to stick together and eventually form a non-fluid gel. Hence the loss of fluidity is due to solvation of the polymer and is not attributable to lowering the temperature.

The principle and practice of the present invention will now be illustrated by the following examples which are only exemplary thereof and it is not intended that the invention be limited thereto since modifications in technique and operation will be apparent to anyone skilled in the art. All parts and percentages in the examples are by weight unless otherwise specified. The inherent viscosity of the polymer systems in the examples were determined at 30° C. using 0.5% solutions thereof in hexamethylphosphoramide.

The weathering test, designated $FS/O_3$, employed in the examples was performed by exposing test film samples to an intense ultraviolet light at 60° C. in a test device containing a rotating bank of twenty Westinghouse FS20T12 Fluorescent Sun Lamps and sealed except for inlet and outlet bleeds controlling passage therethrough of 200 cubic feet per minute of fresh air containing 250 p.p.m. of ozone.

EXAMPLE 1

A one liter reactor vessel equipped with an agitator was charged with 135 cc. of deionized water that had been boiled under nitrogen to remove the oxygen therein. 367 cc. of dimethyl sulfoxide (distilled from 5 A. molecular sieves under nitrogen) was added to the reactor to provide a 75/25 mixture of dimethyl sulfoxide and water. The reactor was purged twice with nitrogen under a pressure of 800 p.s.i.g. The initiator line was purged twice with water and once with initiator. The agitator was set into operation at 500 r.p.m. and the pressure in the reactor vessel was pressurized with vinyl fluoride at 4000–4250 p.s.i.g. and the temperature therein maintained at about 80° C. A solution of 0.1% by weight, based upon the total solution weight, of a water soluble polymerization initiator of 2,2'-diguanyl-2,2'-azo propane dihydrochloride was injected into the reactor vessel. Thereafter, addition of vinyl fluoride monomer to the reactor was commenced in a continual manner at 2 minute intervals and continued until 1,200 grams of vinyl fluoride monomer had been added.

After a total reaction time of 21 minutes, the reaction vessel was found to be filled with a thick dispersion of polyvinyl fluoride weighing 590 grams and of 18.6% solids and the solids having an inherent viscosity of 1.72.

The dispersion was placed into a vacuum flask equipped with an agitator and a distillation column. The vacuum flask was maintained at a temperature of 50° C.–80° C. and under a vacuum of 2–5 mm. Hg. Water and dimethyl sulfoxide were removed to yield a dispersion of 22% solids having 71% dimethyl sulfoxide and 7% water corresponding to a weight ratio of dimethyl sulfoxide-to-water of 91/9. The dispersion was coalesced and then extruded at 150° C. onto a quench drum maintained at 15° C. The extruded film was thereafter reheated to 90° C. for 10 seconds and then stretched at that temperature 2.5× by 2.5× in both of its planar directions, followed by heating at 165° C. for one minute under restraint to remove dimethyl sulfoxide and water and a 2 mil thick film was obtained. The resulting 2 mil stretched film exhibited the following properties:

Elongation _____ percent __ 275
Tenacity _____ p.s.i. __ 20,000
Modulus _____ p.s.i. __ 300,000

The film had outstanding clarity with no surface or internal haze and its color was water white. An accelerated weathering test ($FS/O_3$) decreased the elongation-at-break at a rate predicted to yield a 9½ year life to 10% elongation-at-break.

EXAMPLES 2–11

The procedure described in Example 1 was repeated except that the orangosols were concentrated and cast on ferrotype plates, doctored to the desired thickness, coalesced by infrared heating to self-supporting solvent-containing film, and quenched by immersing the plates in cold water. After stripping from the plate, each film was clamped in a rectangular frame and dried free of volatiles by exposure for five minutes at 150° C. in a forced air draft oven.

The results and pertinent data regarding the process conditions and the film structures obtained are summarized in Table 1 herebelow.

directly from an organosol thereof wherein the polymeric component is of desirably high molecular weight and which is directly coalescible and extrudable in an efficient manner thereby obviating the need of multiple processes requiring intermediate process steps of isolating and recovering the polymerized vinyl fluoride product, and dry-

TABLE 1.—POLYMERIZATION OF VINYL FLUORIDE IN AQUEOUS DIMETHYL SULFOXIDE SYSTEM

| | Polymerization conditions | | | | | | | Film properties | | | |
|---|---|---|---|---|---|---|---|---|---|---|---|
| | Solvent system | | Temp., °C. | Pressure, p.s.i.$\times 10^{-2}$ | Time, min. | $\eta$ inh. | Percent solubility | Percent solids | Ten., p.s.i. $\times 10^{-3}$ | Elong., percent I/W | Mod., p.s.i. $\times 10^{-5}$ |
| Example | Type | Wt. ratio | | | | | | | | | |
| 2 | DMS | 100 | 80 | 45 | 31 | 1.40 | 100 | 12.9 | 4.39 | 17/1 | 2.28 |
| 3 | DMS/H$_2$O | 85/15 | 80 | 45–47 | 32 | 1.36 | 100 | 15.7 | 4.45 | 18/3 | 2.38 |
| 4 | DMS/H$_2$O | 70/30 | 80 | 40–42 | 21 | 1.92 | 100 | 19.0 | 3.37 | 16/4 | 2.10 |
| 5 | DMS/H$_2$O | 65/35 | 80 | 40–42 | 28 | 1.90 | 100 | 19.0 | 4.47 | 60/20 | 2.29 |
| 6 | DMS/H$_2$O | 60/40 | 80 | 40–42 | 18 | 2.05 | 100 | 18.8 | 4.09 | 50/23 | 2.32 |
| 7 | DMS/H$_2$O | 55/45 | 80 | 40–42 | 10 | 2.99 | 100 | 15.7 | 4.75 | 49/15 | 2.48 |
| 8 | DMS/H$_2$O | 52.5/47.5 | 80 | 45–47 | 21 | 3.20 | 100 | 21.8 | 4.21 | [1] 140/49/10 | 2.41 |
| 9 | DMS/H$_2$O | 50/50 | 80 | 40–42 | 12 | 3.00 | 100 | 16.2 | 4.49 | 144/43 | 1.96 |
| 10 | DMS/H$_2$O | 45/55 | 80 | 40–42 | 11 | 3.52 | 100 | 13.6 | 4.36 | 156/52 | 2.21 |
| 11 | DMS/H$_2$O | 45/55 | 98 | 40–42 | 22 | 1.54 | 100 | 9.8 | 4.69 | 20/6 | 2.32 |

[1] Weathered 630 hours in accelerated FS/O$_3$ test.
DMS = Dimethyl Sulfoxide; I = Initial Elongation; W = Weathered, after 315 hrs. Accelerated FS/O$_3$ test.

EXAMPLES 12–16

The procedure described in Examples 2–11 was repeated utilizing the solvents listed in Table 2 herebelow in order to obtain comparative data based upon known and widely employed polymer solvents. The pertinent data are listed in Table 2 from which it is clearly seen that, in direct contrast to the results shown in Table 1, no self-supporting film structure were obtained in any one of the example.

ing and comminuting the agglomerates thereof.

By the term "organosol" as used herein, I mean a colloidal system wherein the polymerized vinyl fluoride particles are dispersed as individual particles in the suspending liquid and not dissolved therein.

What is claimed is:

1. A process for preparing directly coalescible organosols of polymers of vinyl fluoride which comprises polymerizing vinyl fluoride in an aqueous medium comprising

TABLE 2.—POLYMERIZATION OF VINYL FLUORIDE IN COMPARATIVE SOLVENT SYSTEMS

| | Polymerization conditions | | | | | | | | |
|---|---|---|---|---|---|---|---|---|---|
| | Solvent system | | Temp., °C. | Pressure, p.s.i.$\times 10^{-2}$ | Time, min. | $\eta$ inh. | Percent soluble | Percent solids | Ten., p.s.i.$\times 10^{-3}$ |
| Example | Type | Wt. ratio | | | | | | | |
| 12 | DMAC/H$_2$O | 45/55 | 80 | 40–42 | 31 | 0.40 | 100 | 6.0 | No self-supporting film obtained. |
| 13 | BL/H$_2$O | 50/50 | 80 | 40–42 | 60 | 0.47 | 100 | 6.5 | Do. |
| 14 | BL/H$_2$O | 35/65 | 80 | 40–42 | 52 | 0.43 | 100 | 4.8 | Do. |
| 15 | NMP/H$_2$O | 45/55 | 80 | 40–42 | 57 | 0.14 | 100 | 5.0 | Do. |
| 16 | Purified DMF/H$_2$O | 45/55 | 80 | 40–42 | 29 | 0.34 | 100 | 0.9 | Do. |

DMAC = Dimethyl Acetamide; BL = Butyrolactone; NMP = N-Methyl Pyrrolidone; DMF = Dimethylformamide.

EXAMPLES 17–19

The procedure described in Examples 2–11 was repeated for preparing polymers of vinyl fluoride with the comonomers listed in Table 3 herebelow. The pertinent data and the results are shown in Table 3.

dimethyl sulfoxide and up to about 85% by weight, based upon the total weight of said aqueous medium, of water, at a temperature of between about 55° C. and about 140° C. and a pressure of between about 1,000 p.s.i. and about 15,000 p.s.i. thereby to obtain a directly coalescible organosol of polyvinyl fluoride.

TABLE 3.—COPOLYMERIZATION OF VINYL FLUORIDE IN DIMETHYL SULFOXIDE/WATER MIXTURES AT 80° C. AND 4,500–4,700 P.S.I.

| | Polymerization conditions | | | | | Film properties | | | |
|---|---|---|---|---|---|---|---|---|---|
| | Comonomer | | Solvent, wt. ratio | Time, mins. | $\eta$ inh. | Thick., mils | Ten., p.s.i.$\times 10^{-3}$ | Elong., percent I/W | mod., p.s.i.$\times 10^{-5}$ |
| Example | Name | Wt. percent | | | | | | | |
| 17 | Vinyl pivalate | 27 | 45/55 | 10 | 1.21 | 5.1 | 6.43 | 280/29 | 2.27 |
| 18 | C9FA [1] | 18 | 75/25 | 28 | 1.86 | 4.2 | 3.28 | 144/43 | 1.60 |
| 19 | Vinyl butyrate | 40 | 45/55 | 24 | 1.73 | 4.2 | 5.32 | 510/330 | 0.013 |

[1] C9FA = 1,1,9-trihydroperfluorononylacrylate.

It is readily seen from the foregoing description and examples of the process of the present invention that the principal advantage thereof resides in its unique ability, now available for the first time, providing means for preparing shaped articles such as self-supporting film structures or coatings of polymers of vinyl fluoride obtainable 2. The process of claim 1 wherein said organosol of polyvinyl fluoride is characterized by a weight ratio of dimethyl sulfoxide-to-water of between about 88/12 and about 97/3.

3. The process of claim 1 wherein said directly coalescible organosol of polymers of vinyl fluoride is heated to a temperature effective to coalesce the polymer of vinyl fluoride therein and extruded into a shaped structure.

4. The process of claim 3 wherein said shaped structure is a self-supporting film.

References Cited

UNITED STATES PATENTS 2,419,010  4/1947  Coffman et al. _____ 260—92.1
2,810,702  10/1957  Bechtold et al.

FOREIGN PATENTS 651,703  11/1962  Canada.

MURRAY TILLMAN, Primary Examiner

H. ROBERTS, Assistant Examiner

U.S. Cl. X.R.

260—63, 78.5, 86.3, 87.1, 87.5, 92.1